(12) United States Patent
Maskalik et al.

(10) Patent No.: US 10,713,131 B2
(45) Date of Patent: Jul. 14, 2020

(54) AUTOMATIC SELECTION OF NETWORKS WHEN RECOVERING A VIRTUAL MACHINE

(71) Applicant: VMWARE, INC., Palo Alto, CA (US)

(72) Inventors: Serge Maskalik, Palo Alto, CA (US); Uday Masurekar, Palo Alto, CA (US); Narendra Kumar Basur Shankarappa, Palo Alto, CA (US); Anand Pritam, Bangalore (IN)

(73) Assignee: WMware, Inc., Palo Alto, CA (US)

( * ) Notice: Subject to any disclaimer, the term of this patent is extended or adjusted under 35 U.S.C. 154(b) by 214 days.

(21) Appl. No.: 15/871,146

(22) Filed: Jan. 15, 2018

(65) Prior Publication Data

US 2019/0034298 A1    Jan. 31, 2019

(30) Foreign Application Priority Data

Jul. 31, 2017   (IN) .............................. 201741027167

(51) Int. Cl.
| | |
|---|---|
| *G06F 11/20* | (2006.01) |
| *G06F 9/455* | (2018.01) |
| *H04L 12/24* | (2006.01) |
| *G06F 11/14* | (2006.01) |

(52) U.S. Cl.
CPC ........ *G06F 11/203* (2013.01); *G06F 9/45558* (2013.01); *G06F 11/1464* (2013.01); *H04L 41/0663* (2013.01); *G06F 2009/4557* (2013.01); *G06F 2009/45595* (2013.01)

(58) Field of Classification Search
CPC ........ G06F 11/20; G06F 11/203; G06F 11/14; G06F 11/1464

USPC ......................................................... 714/4.11
See application file for complete search history.

(56) References Cited

U.S. PATENT DOCUMENTS

| | | | | |
|---|---|---|---|---|
| 9,176,829 B2 * | 11/2015 | Jain | ..................... | G06F 11/1484 |
| 9,804,802 B2 * | 10/2017 | Prasad | ................. | G06F 3/0619 |
| 10,223,218 B2 * | 3/2019 | Cors | ...................... | G06F 11/203 |
| 2011/0066786 A1 * | 3/2011 | Colbert | ............... | G06F 9/45558 711/6 |
| 2015/0370659 A1 * | 12/2015 | Pershin | ................. | G06F 11/203 714/4.11 |
| 2015/0370660 A1 * | 12/2015 | Pershin | ................. | G06F 11/203 714/4.11 |
| 2016/0105321 A1 * | 4/2016 | Thakkar | .............. | H04L 41/0853 709/220 |
| 2016/0105392 A1 * | 4/2016 | Thakkar | .............. | H04L 61/2038 709/220 |
| 2016/0188353 A1 * | 6/2016 | Shu | ..................... | G06F 9/45533 718/1 |

(Continued)

*Primary Examiner* — Kamini B Patel
(74) *Attorney, Agent, or Firm* — Patterson + Sheridan, LLP

(57) ABSTRACT

One or more embodiments provide techniques for migrating a virtual machine (VM) from a private data center to a cloud data center. A hybridity manager receives a request at the cloud data center to replicate a VM from the private data center on the cloud data center. The hybridity manager identifies a source network associated with the VM. The hybridity manager identifies whether there exists a stretched network associated with the source network of the VM. Responsive to determining that there is a stretched network associated with the source network of the VM, the hybridity manager replicates the VM on the stretched network without reconfiguring internet-protocol (IP) settings of the VM.

17 Claims, 5 Drawing Sheets

(56) References Cited

U.S. PATENT DOCUMENTS

| | | | |
|---|---|---|---|
| 2018/0062920 A1* | 3/2018 | Srinivasan | H04L 61/2592 |
| 2018/0062929 A1* | 3/2018 | Maskalik | H04L 41/0806 |
| 2018/0063000 A1* | 3/2018 | Wu | G06F 9/45558 |
| 2018/0181434 A1* | 6/2018 | Ivanov | G06F 9/4856 |
| 2018/0183762 A1* | 6/2018 | Fetvadjiev | G06F 9/5072 |
| 2018/0239679 A1* | 8/2018 | Yang | G06F 11/2023 |
| 2019/0034297 A1* | 1/2019 | Basur Shankarappa | G06F 9/5077 |

* cited by examiner

AUTOMATIC SELECTION OF NETWORKS WHEN RECOVERING A VIRTUAL MACHINE

RELATED APPLICATIONS

Benefit is claimed under 35 U.S.C. 119(a)-(d) to Foreign Application Serial No. 201741027167 filed in India entitled "AUTOMATIC SELECTION OF NETWORKS WHEN RECOVERING A VIRTUAL MACHINE", on Jul. 31, 2017, by VMware, Inc., which is herein incorporated in its entirety by reference for all purposes.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

A hybrid cloud system aggregates the resource capabilities from both private and public clouds. A private cloud can include one or more customer data centers (referred to herein as "private data centers"). The public cloud can include a multi-tenant cloud architecture providing IaaS cloud services.

SUMMARY

One or more embodiments provide techniques for migrating a virtual machine (VM) from a private data center to a cloud data center. A hybridity manager receives a request at the cloud data center to replicate a VM from the private data center on the cloud data center. The hybridity manager identifies a source network associated with the VM. The hybridity manager identifies whether there exists a stretched network associated with the source network of the VM. Responsive to determining that there is a stretched network associated with the source network of the VM, the hybridity manager replicates the VM on the stretched network without reconfiguring internet-protocol (IP) settings of the VM.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
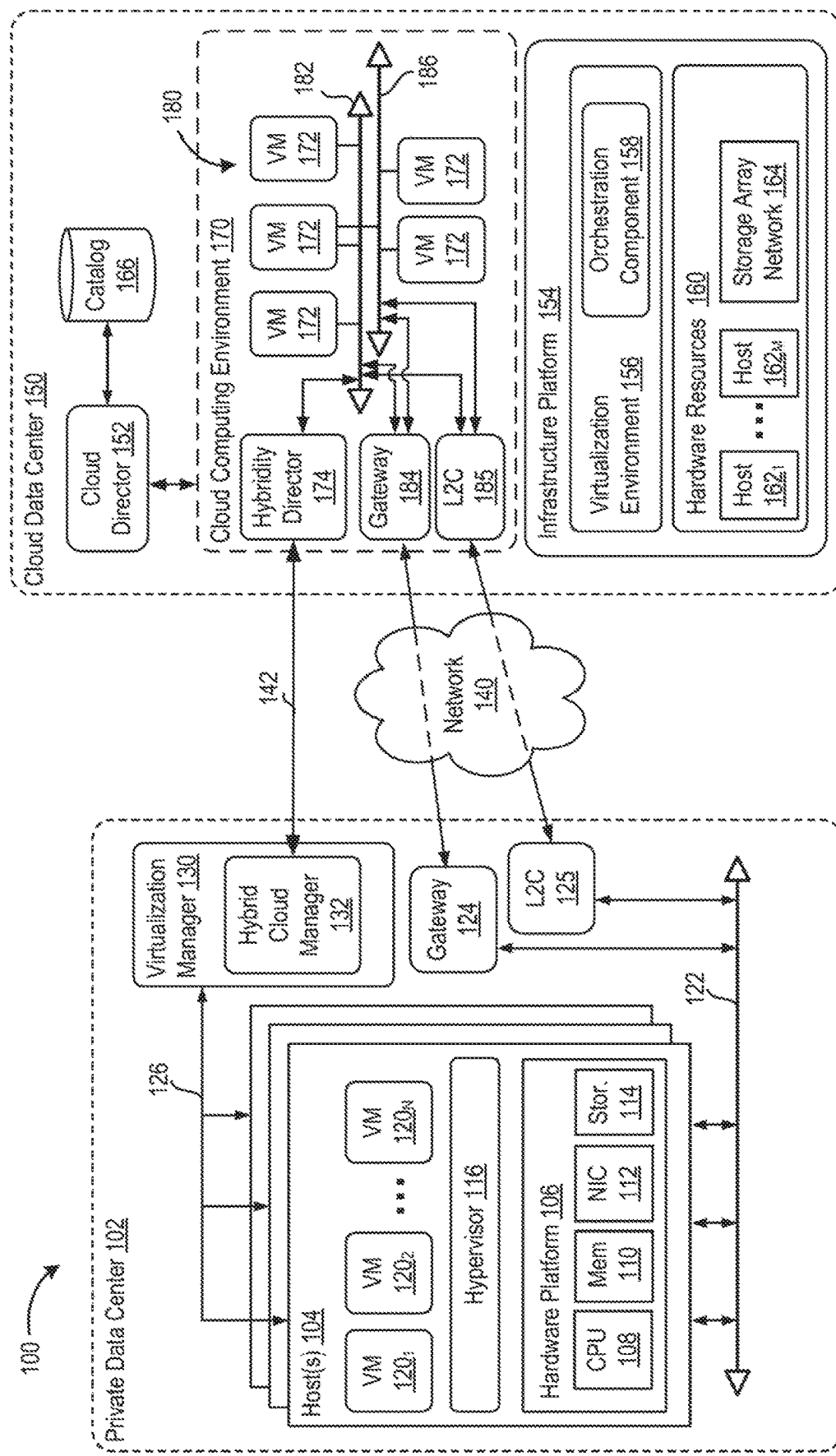
FIG. 1 is a block diagram of a hybrid cloud computing system, according to an embodiment.

FIG. 1 is a block diagram of a hybrid cloud computing system 100 in which one or more embodiments of the present disclosure may be utilized. Hybrid cloud computing system 100 includes a virtualized computing system implementing a private data center 102 and a virtualized computing system implementing a cloud data center 150. Hybrid cloud computing system 100 is configured to provide a common platform for managing and executing virtual workloads seamlessly between private data center 102 and cloud data center 150. In one embodiment, private data center 102 may be a data center controlled and administrated by a particular enterprise or business organization, while cloud data center 150 may be operated by a cloud computing service provider and exposed as a service available to account holders, such as the particular enterprise in addition to other enterprises. As such, private data center 102 may sometimes be referred to as a "private" cloud, and cloud data center 150 may be referred to as a "public" cloud.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Private data center 102 includes one or more host computer systems ("hosts 104"). Hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within private data center 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104.

Private data center 102 includes a virtualization management component (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in private data center 102, or alternatively, running as a VM in one of hosts 104. One example of a virtualization manager is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud data center 150 with virtualized computing resources of computing system 102 to form a unified "hybrid" computing platform. Hybrid cloud manager 132 is configured to deploy VMs in cloud data center 150, transfer VMs from private data center 102 to cloud data center 150, and perform other "cross-cloud" administrative tasks, as described in greater detail later. In one implementation, hybrid cloud manager 132 is a module or plug-in complement to virtualization manager 130, although other implementations may be used, such as a separate computer program executing in a central server or running in a VM in one of hosts 104. One example of hybrid cloud manager 132 is the VMware vCloud Connector® product made available from VMware, Inc.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in private data center 102 with connectivity to an external network 140 (e.g., Internet). Gateway 124 may manage external public IP addresses for VMs 120 and route traffic incoming to and outgoing from private data center 102 and provide networking services, such as firewalls, network address translation (NAT), dynamic host configuration protocol (DHCP), load balancing, and virtual private network (VPN) connectivity over a network 140.

In one or more embodiments, cloud data center 150 is configured to dynamically provide an enterprise (or users of an enterprise) with one or more virtual data centers 170 in which a user may provision VMs 120, deploy multi-tier applications on VMs 120, and/or execute workloads. Cloud data center 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud data center 150 may in fact be distributed across multiple data centers in different locations.

Each cloud computing environment 170 is associated with a particular tenant of cloud data center 150, such as the enterprise providing private data center 102. In one embodiment, cloud computing environment 170 may be configured as a dedicated cloud service for a single tenant comprised of dedicated hardware resources 160 (i.e., physically isolated from hardware resources used by other users of cloud data center 150). In other embodiments, cloud computing environment 170 may be configured as part of a multi-tenant cloud service with logically isolated virtualized computing resources on a shared physical infrastructure. As shown in FIG. 1, cloud data center 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web application or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to private data center 102, virtualization environment 156 may be implemented by running on hosts 162 VMware ESXi™-based hypervisor technologies provided by VMware, Inc. (although it should be recognized that any other virtualization technologies, including Xen® and Microsoft Hyper-V® virtualization technologies may be utilized consistent with the teachings herein).

In one embodiment, cloud data center 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp technology made available by VMware, Inc., although other technologies may be utilized. Cloud director 152 receives provisioning requests submitted (e.g., via REST API calls) and may propagates such requests to orchestration component 158 to instantiate the requested virtual machines (e.g., VMs 172). One example of cloud director 152 is the VMware vCloud Director® produced by VMware, Inc.

In the embodiment of FIG. 1, cloud computing environment 170 supports the creation of a virtual data center 180 having a plurality of virtual machines 172 instantiated to, for example, host deployed multi-tier applications, as well as one or more virtualization managers 173 (abbreviated as "Vman(s)"). A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160. Virtualization managers 173 can be configured similarly to virtualization manager 130.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within private data center 102. In other embodiments, gateway 184 may be configured to connect to communicate with private data center 102 using a high-throughput, dedicated link (depicted as a direct connect 142) between private data center 102 and cloud data center 150. Layer 2 (L2) concentrators C 125 and 185 are parallel to gateways 124 and 184. L2 concentrator 125 and L2 concentrator 185 are configured to provide a "stretched" L2 network that private data center 102 and cloud data center 150 so that, for example, a VM may be migrated over network 140 without requiring its internet protocol (IP) address to be reconfigured on cloud data center 150, such that communication with the VM may be preserved after replication.

In one embodiment, each virtual data center 180 includes a hybridity director module (e.g., hybridity director 174) configured to communicate with the corresponding hybrid cloud manager 132 in private data center 102 to enable a common virtualized computing platform between private data center 102 and cloud data center 150. In an embodiment, hybridity director 174 may execute as a VM in cloud data center 150. Hybridity director 174 may communicate with hybrid cloud manager 132 using Internet-based traffic via a VPN tunnel established between gateways 124 and 184, or alternatively, using direct connect 142.

Creating Layer 2 Extension Networks

An L2 extension network, or "stretched network," is a network spanning both the private data center 102 and the cloud data center 150 in a hybrid cloud computing system 100. Stretched networks enable, among other things, seamless workload migration by allowing endpoint network configuration and connections to existing networks in private data center 102 to be kept when workloads are moved to cloud data center 150.

Figure 2:
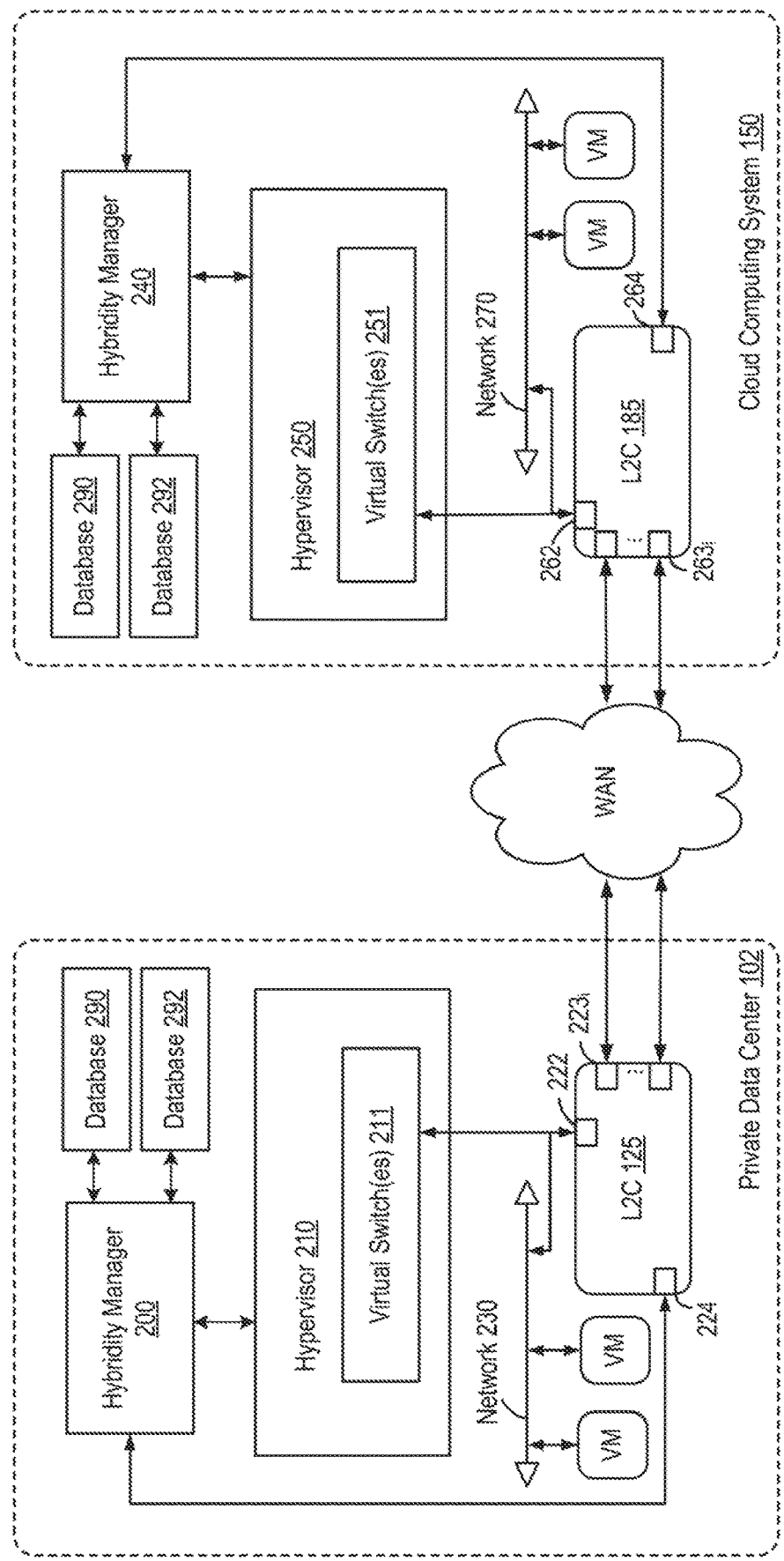
FIG. 2 illustrates components of hybrid cloud computing system of FIG. 1 used to create a stretched network, according to an embodiment.

FIG. 2 illustrates components of hybrid cloud computing system 100 used to create a stretched network, according to an embodiment. As shown, L2 concentrators 125 and 185 are virtual machines deployed in private data center 102 and cloud data center 150, respectively. Hybridity manager 200 and hybridity manager 240 access L2 concentrators 125 and 185, respectively. In an embodiment, hybridity manager 200 corresponds to hybrid cloud manager 132, and hybridity manager 240 corresponds to hybridity director 174. Hybridity managers 200, 240 may be registered with each other and tethered together, each having the ability to perform tasks requested by the other to execute hybrid tasks together. As discussed in greater detail below, to create the stretched network, L2 concentrator appliances 125, 185 are paired together. One or more Internet Protocol Security (IPsec) tunnels are created between them, thereby creating a stretched network between private data center 102 and cloud data center 150.

L2 concentrators 125, 185 include virtual network interface cards (VNICs) $221_i$ and $261_i$, respectively. VNICs $221_i$, $261_i$ are software-based virtual network adapters that may be logically connected to one or more physical network adapters (PNICs) via virtual switches 211, 251 provided by hypervisors 210, 250, respectively. In an embodiment, virtual switches 211, 251 may be, for example, distributed virtual switches or components thereof. A distributed virtual switch is a type of virtual switch that extends ports and management across host servers. In an embodiment, L2 concentrators 125, 185 each include one VNIC that is a management interface, which is illustrated as VNICs 224, 264, which are connected to management networks 230, 270 and in communication with hybridity managers 200, 240, respectively. L2 concentrators 125, 185 may further include one or more VNICs that are uplink interfaces providing traffic paths to PNIC, which are shown as VNIC $223_i$ and VNIC $263_i$. The uplinks are connected to uplink network(s), which may be provided by a user along with IPs from a range or in a list for the uplink. Additionally, L2 concentrators 125, 185 may each include one VNIC (i.e., VNIC 222 and VNIC 262) that acts as a bridge interface to be connected to private data center 102 network (e.g., VLAN) or cloud data center 150 network (e.g., virtual extensible LAN (VXLAN)) participating in the stretched network and whose connected virtual switch port is configured as a sinking port. Although one pair of bridging interfaces is shown for L2 concentrators 125, 185, it should be understood that any number of bridging interfaces (i.e., any number of stretched networks) may be employed in other embodiments.

Hybridity manager 200 configures L2 concentrator 125 to enable bridging on bridge VNIC 222. Hybridity manager 200 also configures L2 concentrator 125 with details of the local and remote L2 concentrator 185 peer IP addresses. In an embodiment, the peer IP address may be derived from an internal IP address pool. Hybridity manager 240 may configure L2 concentrator 185 to enable bridging, as well as details of local and remote peer IP addresses. Bridging is then configured and enabled.

In the process of creating a stretched network, hybridity manager 200 reserves bridge VNIC 222, and connects it to a network 230 being stretched. For example, hybridity manager 200 may connect VNIC 222 to a particular port group where VMs connected to the port group belong to the same network 230 (e.g., a VLAN). L2 concentrator 185 is connected to network 270 and may inject the traffic it receives from L2 concentrator 125 on to network 270 so that the traffic is ultimately routed to the non-local destination in cloud data center 150. This process essentially gives the illusion that there is nothing between network 230 in private data center 102 and network 260 in cloud data center 150, i.e., that networks 230 and 270, together, form a stretched network spanning private data center 102 and cloud data center 150.

Current disaster recovery solutions allow user to define one or more VM on their private data center 102 that they wish to protect for recovery purposes at the destination/disaster recover site (e.g., cloud data center 150). Such recovery operations enable a cloud director at cloud data center 150 to create a replica VM on cloud data center 150, responsive to a protected VM failing on private data center 102. Existing solutions, however, limit the user to configure only a single "recovery network" on which the VM, once recovered, will land. This means that all protected VMs, once recovered, will initially be hosted on the same network. As such, a user would need to reconfigure each VM to re-adjust its respective IP address, and then re-attach the VM to a different network, depending on which application tier the VM belongs.

This becomes increasingly more challenging when disaster recovery solutions attempt to account for partial failures. A partial failure occurs when a subset of protected VMs on a particular network has failed, and thus, need to be recovered on cloud data center 150. In such cases, not only do the recovered VMs on cloud data center 150 need to be reconfigured with a new IP and a new attachment to a different network, but also, the workloads that were previously accessing the recovered VMs with their original IP addresses. The new IP addresses of the recovered VMs need to be conveyed/advertised to each VM that were previously accessing the protected VMs before failure.

Accordingly, users may take advantage of network stretching between private data center 102 and cloud data center 150. For example, during disaster recovery configuration, for each protected VM, a user may identify the network on which that VM runs, and create a stretched network, stretching the network upon which the VM runs from private data center 102 to cloud data center 150 so that, once replicated, the replicated VM will land on the stretched network at cloud data center 150. As such, the VM would retain the same IP address as the source network, thus eliminating the need for reconfiguration once landed on cloud data center 150.

Figure 3:
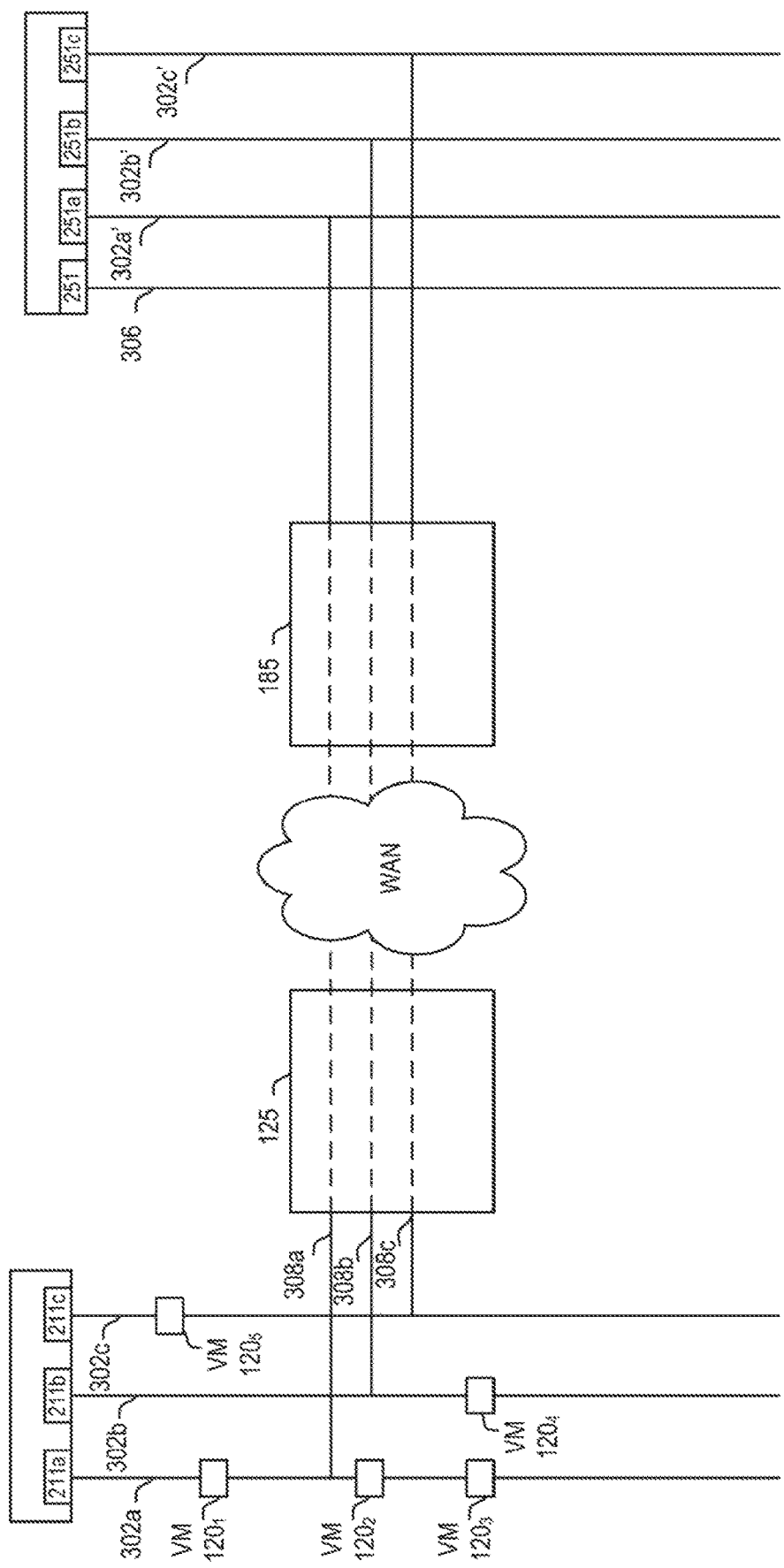
FIG. 3 is a logical diagram of an example of network stretching between a private data center and a cloud data center, according to an embodiment.

FIG. 3 illustrates a logical diagram 300 of an example of network stretching between private data center 102 and cloud data center 150, according to an example. Each stretched network denoted in FIG. 3 may have been formed using the techniques discussed above in conjunction with FIG. 2.

Logical diagram 300 illustrates one or more networks on private data center 102. For example, as illustrated, private data center 102 includes network 302a, 302b, and 302c. Upon each network runs one or more VMs 120. For example, VM 120$_1$, VM 120$_2$, and VM 120$_3$ run on network 302a; VM 120$_4$ runs on network 302b; and VM 120$_5$ runs on network 302c. Each network 302a-302c is coupled to a virtual switch 211$_i$. For example, network 302a is connected to virtual switch 211$_a$; network 302b is connected to virtual switch 211b; and network 302c is connected to virtual switch 211$_i$. For disaster recovery purposes, a user has previously marked each VM 120$_1$, VM 120$_3$, VM 120$_4$, and VM 120$_5$ as protected. During operation assume that there is a partial failure on network 302a, and VMs 120$_1$ and 120$_3$ have failed. Accordingly, replica VMs for VM 120$_1$ and 120$_3$ will need to be brought up on cloud data center 150. Conventionally, as discussed above, the replica VM for VM 120$_1$, i.e., VM120'$_1$, would be replicated on a pre-configured recovery network 306 on cloud data center 150. During configuration, however, user would configure a stretched network between private data center 102 to cloud data center 150 such that network 302a may be "stretched onto" cloud data center 150. For example, cloud data center 150 creates a network 302a' to which a stretched network 304 may extend.

Figure 4:
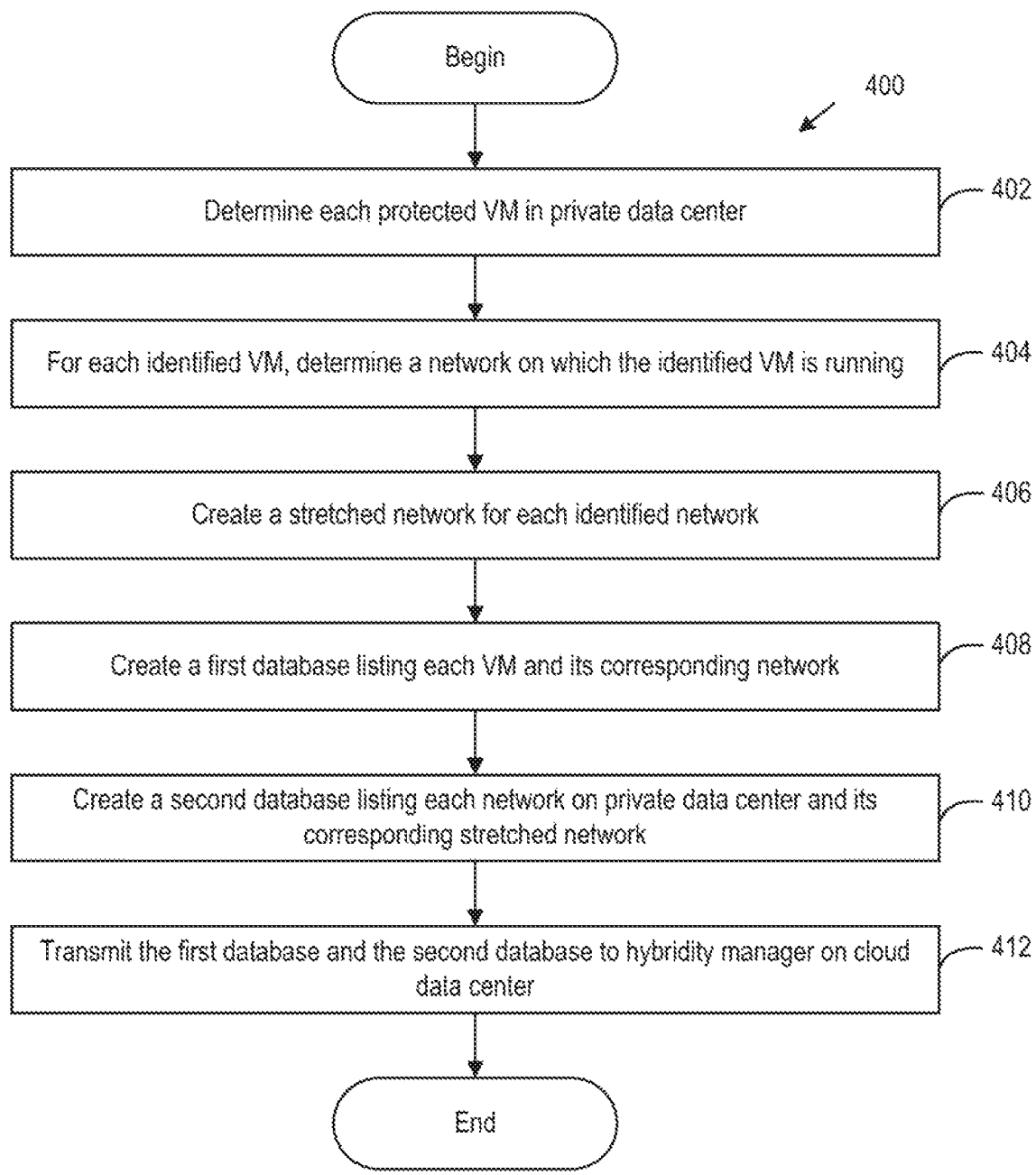
FIG. 4 is a flow diagram of a method for configuring a virtual machine for migration, according to an embodiment.

FIG. 4 is a flow diagram of a method 400 for configuring a VM for migration, according to one embodiment. At step 402, hybridity manager 200 determines each protected VM in private data center 102. For example, hybridity manager 200 determines each VM a user marked as protected for purposes of disaster recovery. In a general example, hybridity manager 200 may query the private data center 102 for all VMs running therein.

At step 404, for each VM identified in step 402, hybridity manager 200 determines a network each VM is running thereon. For example, referring to FIG. 3, after hybridity manager 200 determines that VM 120$_1$, VM120$_3$, VM 120$_4$, and VM 120$_5$ are protected, hybridity manager 200 determines on which network each VM, VM 120$_1$, VM120$_3$, VM 120$_4$, and VM 120$_5$, is running. Thus, hybridity manager 200 determines that VM 120$_1$ and 120$_3$ run on network 302a; VM 120$_4$ runs on network 302b; and VM 120$_5$ runs on network 302c.

At step 406, hybridity manager 200 creates a stretched network for each network identified in step 404. Hybridity manager 200 may communicate with hybridity manager 240, requesting that hybridity manager 240 creates one or more networks, each network corresponding to a network to be stretched in private data center 102. For example, hybridity manager 240 may create networks 302a', 302b', and 302c'. Each network 302a'-302c' is coupled to a virtual switch 251$_i$. For example, network 302a is connected to virtual switch 251$_a$; network 302b is connected to virtual switch 251$_b$; and network 302c is connected to virtual switch 251$_c$. Accordingly, hybridity manager 200 may stretch network 302a on to network 302a' (visually shown as 308a), network 302b onto 302b' (visually shown as 308b), and network 302c onto network 302c' (visually shown as 308c). The stretched networks may be created in accordance with the methods discussed above in conjunction with FIG. 2.

At step 408, hybridity manager 200 creates a first database 290 (illustrated in FIG. 2) listing each VM and its corresponding network. For example, hybridity manager 200 creates a database 290 having a first column listing each VM (e.g., VM 120$_1$, VM120$_3$, VM 120$_4$, and VM 120$_5$) and a second column listing the corresponding network for each VM (e.g., network 302a, network 302a, network 302b, network 302c).

Database 1

| VM Name | VM Network |
|---|---|
| VM $120_1$ | Network 302a |
| VM $120_3$ | Network 302a |
| VM $120_4$ | Network 302b |
| VM $120_5$ | Network 302c |
| ... | ... |
| VM $120_n$ | Network 302n |

At step 410, hybridity manager creates a second database 292 (illustrated in FIG. 2) listing each network on private data center 102 and its corresponding stretched network on cloud data center 150. For example, hybridity manager 200 creates a database 292 having a first column listing each network (e.g., network 302a, network 302b, network 302c) and a second column listing the corresponding stretched network on cloud data center 150 (e.g., network 302a', network 302b', network 302c').

Database 2

| Network | Stretched Network |
|---|---|
| Network 302a | Network 302a' |
| Network 302b | Network 302b' |
| Network 302c | Network 302c' |
| ... | ... |
| Network 302n | Network 302n' |

At step 412, hybridity manager 200 may transmit the first database 290 and the second database 292 to hybridity manager 240. In an embodiment, the first database 290 and the second database 292 may be transmitted to cloud data center 150 during a disaster recovery synchronization. In another embodiment, the first database 290 and the second database 292 may be transmitted to cloud data center 150 responsive to private data center 102 receiving a request to transmit a snapshot of the current state of VMs on private data center 102. Retaining a copy of the first and second databases 290, 292 on cloud data center 150 aids in scenarios when, during disaster recovery, the first and second databases on private data center 102 may be inaccessible.

Figure 5:
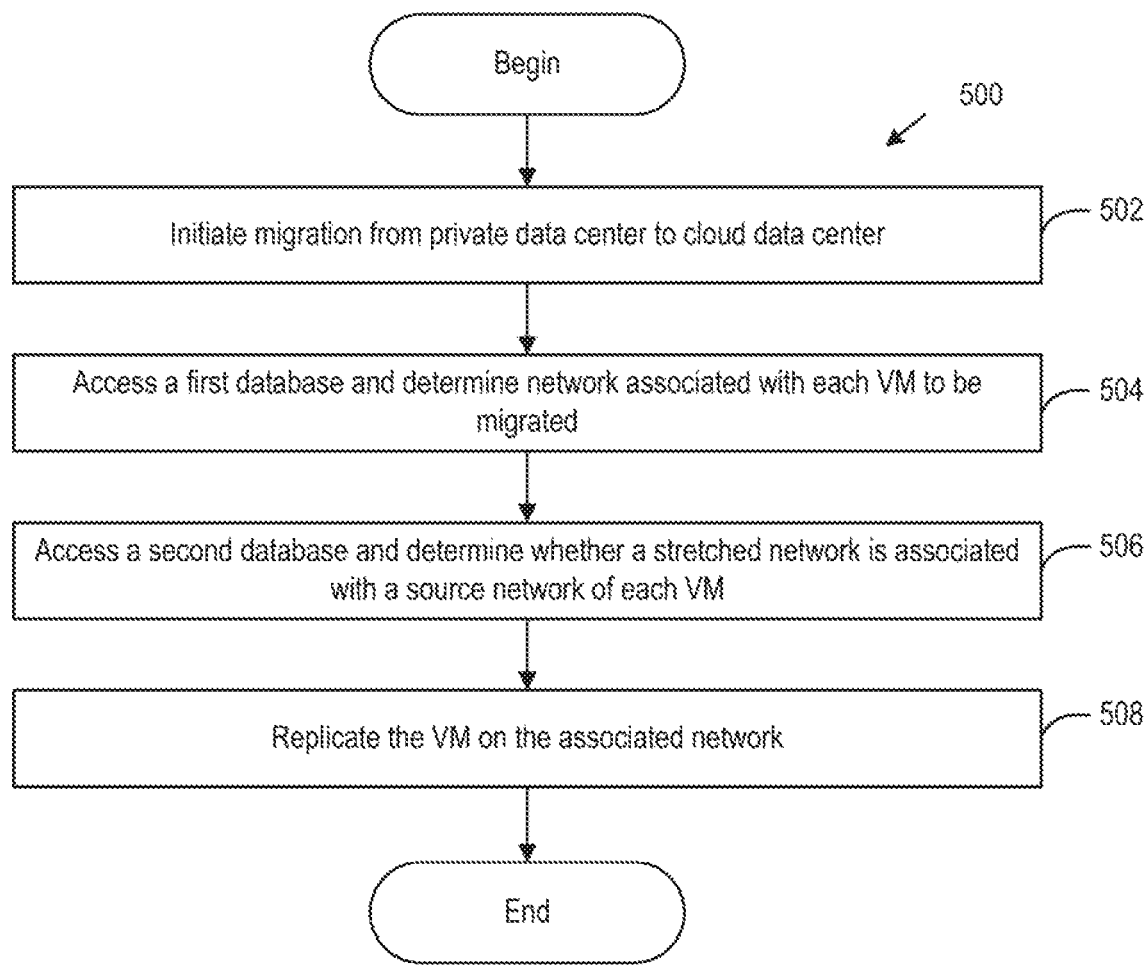
FIG. 5 is a flow diagram of a method for migrating a virtual machine from private data center to cloud data center, according to an embodiment.

FIG. 5 is a flow diagram of a method 500 migrating a VM from private data center 102 to cloud data center 150, according to one embodiment. At step 502, an event to migrate one or more VMs from private data center 102 to cloud data center 150 is triggered. In an embodiment, method 500 may be initiated as a result of a disaster recovery scenario. In another embodiment, method 500 may be initiated as a result of a migration request by a user. For example, a user may wish to migrate one or more VMs from private data center 102 to cloud data center 150.

At step 504, hybridity manager 240 accesses the first database and determines the network associated with each VM to be migrated. For example, assuming VM $120_1$ is to be migrated, hybridity manager 240 will look up in the first database the source network of VM $120_1$. At step 506, hybridity manager 240 accesses the second database and determines whether there is a stretched network associated with source network of VM $120_1$. For example, by looking at the first database, hybridity manager 240 determines that the source network of VM $120_1$ is network 302a. Hybridity manager 240 would then trace network 302a to an associated stretched network by referring to the second database. By referring to the second database, hybridity manager 240 determines that the associated stretched network for network 302a is 302a'. In some embodiments, hybridity manager 240 may determine that there is not an associated stretched network for a source network of a given VM. In these scenarios, hybridity manager 240 will associate the defaulted recovery network 306 with that VM.

At step 508, hybridity manager 240 replicates the VM on the associated network determined in step 506. For example, for VM $120_1$ hybridity manager 240 replicates VM $120_1$ on network 302a'. In another example, for VM 120, for which a stretched network was not created, hybridity manager 240 replicates VM 120, on default recovery network 306.

Accordingly, hybridity manager 240 replicates each VM on cloud data center 150 without having to reconfigure each individual IP address of each VM through the use of stretched networks. Thus, all VMs for which a stretched network is associated will land on a corresponding network to which their source network maps. Because the original IP of the VM is retained, this allows other VMs which were communicating with the VM on private data center 102 to continue communication with the recovered VM on the same IP address that was used prior to disaster and/or migration.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of migrating virtual machines (VMs) from a private data center to a cloud data center, comprising:
   receiving a request at the cloud data center to replicate a VM from the private data center on the cloud data center;
   identifying a source network associated with the VM;
   identifying whether there exists a stretched network associated with the source network of the VM;
   responsive to determining that there exists the stretched network associated with the source network of the VM, replicating the VM on the stretched network without reconfiguring internet-protocol (IP) settings of the VM; and
   responsive to determining that there does not exist the stretched network associated with the source network of the VM, replicating the VM on a default recovery network on the cloud data center.

2. The method of claim 1, wherein receiving the request at the cloud data center to replicate the VM from the private data center on the cloud data is performed responsive to a disaster recovery scenario.

3. The method of claim 1, wherein the source network associated with the VM is a network on which the VM was running on the private data center.

4. The method of claim 1, wherein identifying the source network associated with the VM, comprises:
   accessing a first database on the cloud data center, wherein the first database stores data specific to each VM created in the private data center and a network upon which each VM runs.

5. The method of claim 1, wherein identifying whether there exists the stretched network associated with the VM, comprises:
   accessing a second database on the cloud data center, wherein the second database stores data specific to each network in the private data center and an associated stretched network if the stretched network was created for the source network.

6. The method of claim 5, wherein responsive to another VM not having the stretched network associated therewith, storing data specific to the default recovery network as an associated network with the other VM.

7. A non-transitory computer readable medium having instructions stored thereon that, when executed by a processor, cause the processor to perform a method of migrating virtual machines (VMs) from a private data center to a cloud data center, comprising:
   receiving a request at the cloud data center to replicate a VM from the private data center on the cloud data center;
   identifying a source network associated with the VM;
   identifying whether there exists a stretched network associated with the source network of the VM;

responsive to determining that there exists the stretched network associated with the source network of the VM, replicating the VM on the stretched network without reconfiguring internet-protocol (IP) settings of the VM; and responsive to determining that there does not exist the stretched network associated with the source network of the VM, replicating the VM on a default recovery network on the cloud data center.

8. The non-transitory computer readable medium of claim 7, wherein receiving the request at the cloud data center to replicate the VM from the private data center on the cloud data is performed responsive to a disaster recovery scenario.

9. The non-transitory computer readable medium of claim 7, wherein the source network associated with the VM is a network on which the VM was running on the private data center.

10. The non-transitory computer readable medium of claim 7, wherein identifying the source network associated with the VM, comprises:

accessing a first database on the cloud data center, wherein the first database stores data specific to each VM created in the private data center and a network upon which each VM runs.

11. The non-transitory computer readable medium of claim 7, wherein identifying whether there exists the stretched network associated with the VM, comprises:

accessing a second database on the cloud data center, wherein the second database stores data specific to each network in the private data center and an associated stretched network if the stretched network was created for the source network.

12. The non-transitory computer readable medium of claim 11, wherein responsive to another VM not having the stretched network associated therewith, storing data specific to the default recovery network as an associated network with the other VM.

13. A computer system, comprising:

a processor; and a memory storing program code, which, when executed on the processor, performs a method of migrating virtual machines (VMs) from a private data center to a cloud data center, comprising:

receiving a request at the cloud data center to replicate a VM from the private data center on the cloud data center;

identifying a source network associated with the VM;

identifying whether there exists a stretched network associated with the source network of the VM;

responsive to determining that there exists the stretched network associated with the source network of the VM, replicating the VM on the stretched network without reconfiguring internet-protocol (IP) settings of the VM; and responsive to determining that there does not exist the stretched network associated with the source network of the VM, replicating the VM on a default recovery network on the cloud data center.

14. The computer system of claim 13, wherein receiving the request at the cloud data center to replicate the VM from the private data center on the cloud data is performed responsive to a disaster recovery scenario.

15. The computer system of claim 13, wherein the source network associated with the VM is a network on which the VM was running on the private data center.

16. The computer system of claim 13, wherein identifying the source network associated with the VM, comprises:

accessing a first database on the cloud data center, wherein the first database stores data specific to each VM created in the private data center and a network upon which each VM runs.

17. The computer system of claim 13, wherein identifying whether there exists the stretched network associated with the VM, comprises:

accessing a second database on the cloud data center, wherein the second database stores data specific to each network in the private data center and an associated stretched network if the stretched network was created for the source network.

\* \* \* \* \*